United States Patent [19]

Ito et al.

[11] Patent Number: 4,664,934

[45] Date of Patent: May 12, 1987

[54] PROCESS FOR MANUFACTURING SOLID ELECTROCHROMIC ELEMENT

[75] Inventors: Toshiyasu Ito; Takaaki Mori; Jun Minoura; Junichi Shimada, all of Aichi, Japan

[73] Assignee: Toyoda Gosei Co., Ltd., Nishikasugai, Japan

[21] Appl. No.: 826,866

[22] Filed: Feb. 6, 1986

[30] Foreign Application Priority Data

Feb. 7, 1985 [JP] Japan .................................. 60-23031
Feb. 7, 1985 [JP] Japan .................................. 60-23033
Feb. 7, 1985 [JP] Japan .................................. 60-23035
Feb. 20, 1985 [JP] Japan .................................. 60-31939

[51] Int. Cl.$^4$ ............................................. B05D 3/06
[52] U.S. Cl. .................................. 427/38; 204/192.31; 427/35; 427/66; 427/123; 427/404
[58] Field of Search ...................... 427/38, 35, 123, 66; 204/192 SP, 192 N Primary Examiner—Bernard D. Pianalto Attorney, Agent, or Firm—Cushman, Darby & Cushman

[57] ABSTRACT

The solid electrochromic element of this invention is to be used for various types of dimmers and displays, and comprises a pair of electrode layers, an oxidation color-developing layer, an ion-donating layer and a reduction color-developing layer laminated one upon another on a substrate. In the manufacture of this type of electrochromic element, the pair of electrode layers and the ion-donating layer are formed by the ion plating technique.

The dimmers of this invention for automotive sun roof, side-watching window and glare-free mirror each contains an electrochromic element manufactured by the process mentioned above. The light transmittance of the sun roof and side-watching window, as well as the intensity of reflecting light at the glare-free mirror, are appropriately controlled according to the conditions of their use by application of a variable voltage across the two electrode layers of the electrochromic element.

3 Claims, 12 Drawing Figures

PROCESS FOR MANUFACTURING SOLID ELECTROCHROMIC ELEMENT

BACKGROUND OF THE INVENTION

1. Field of the Invention

This invention relates to a process for manufacturing solid electrochromic element to be used as various dimmers and displays, and to automotive dimmers for sun roof, side-watching window and glare-free mirror using said solid electrochromic element.

2. Description of the Related Arts

Solid-state light-emitting diode (LED) and liquid crystal display (LCD) are extensively used in the electronics and related industries as various types of display elements. Studies are now under way to put electrochromic (EC) element to practical use as a new type of display element having unique characteristics not to be expected from LED and LCD.

Electrochromic elements are those elements in which the electrochromic substances involved undergo a redox reaction when a voltage is externally applied, causing reversible changes in color or light transmittance.

Electrochromic substances may be roughly divided into inorganic and organic materials. Typical examples are oxides of transition metals for the former and viologen derivatives for the latter, but many other compounds are being used in recent years.

In any of these cases, each element is basically composed of several kinds of electrochromic materials laminated one upon another and sandwiched by a pair of electrodes.

Of the many types of electrochromic element, solid electrochromic elements (in which all the layes involved are solid) are receiving special attention in terms of reliability, cost, and the wide range of application field.

Solid electrochromic element may be manufactured by various physical vapor deposition (PVD) processes, for example, by the vacuum deposition or sputtering process. Alternatively, the vacuum deposition and the sputtering processes are used in combination in some cases; thin film of electrodes, color-developing layers and ion-donating layer (each made of oxides of transition metals and the like) are laminated one upon another on a glass substrate, using separate apparatuses for the two processes.

These deposition processes, however, have many disadvantages. The vacuum deposition process suffers from low adhesion of deposited elements to the substrate and from difficulty in obtaining elements of high conductivity. The sputtering process is low in productivity because of the long time required for lamination. In addition, the resultant elements are liable to deterioration because of the increased temperature of substrate, and the adhesion of thin layers is also poor. The combination of the vacuum deposition process with the sputtering process has the disadvantage that semi-finished products have to be taken out from the treating apparatuses during manufacture. This not only results in lower productivity, but may lead to degraded element characteristics due to contamination of the surface of each layer with impurities in atmospheric air.

Figure 5:
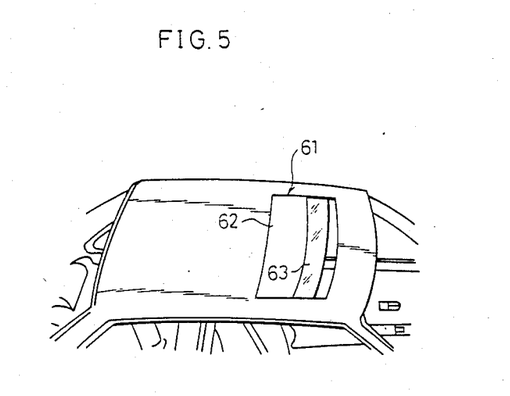
FIG. 5 is a perspective view of a related-art automotive sun roof.

Recently sun roofs are frequently installed on motorcars for the purpose of giving a spacious and roomy feeling and of properly adjusting the lightness in the interior. FIG. 5 is a related-art sun roof composed of a roof section 62 made of steel and a glass section 63, in which the quantity of light that enters the interior is controlled by properly sliding said roof section 62 by manual operation or by the aid of a motor. Besides this, there is another type of sun roofs using a glass section with mesh print. The slide operation of the above-mentioned sun roof 61, whether it be manual or motor-driven, is a cumbersome work because it must be performed while observing the sun roof. In the mesh-type sun roofs, on the other hand, the quantity of entering light cannot be adjusted.

Figure 6:
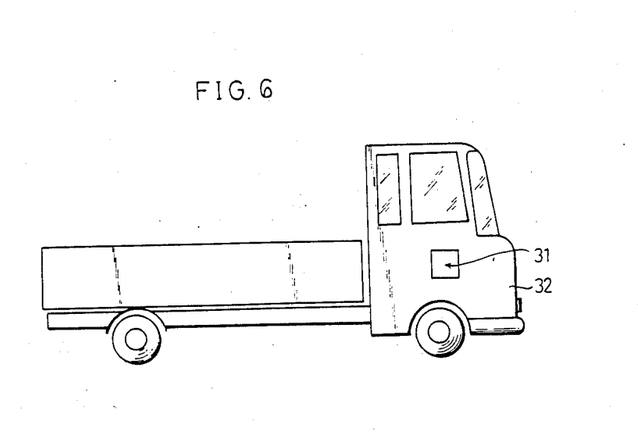
FIG. 6 is a side view of a motortruck showing the position of its side-watching window.

Large cars such as motortrucks have a side-watching window at the door near the driver's seat through which the driver can judge, when turning to the right or changing the lane, if any obstruction is present or not on the side (see FIG. 6). The larger the area of side-watching window, the more correctly will the driver be able to check the presence or absence of obstructions. An excessively large window, however, will disturb the driver because the road surface on the side and other objects also come in sight, and will pose the problem of possible invasion of driver's privacy because the interior of driver's cab is fully exposed to view.

Figures 9, 12:
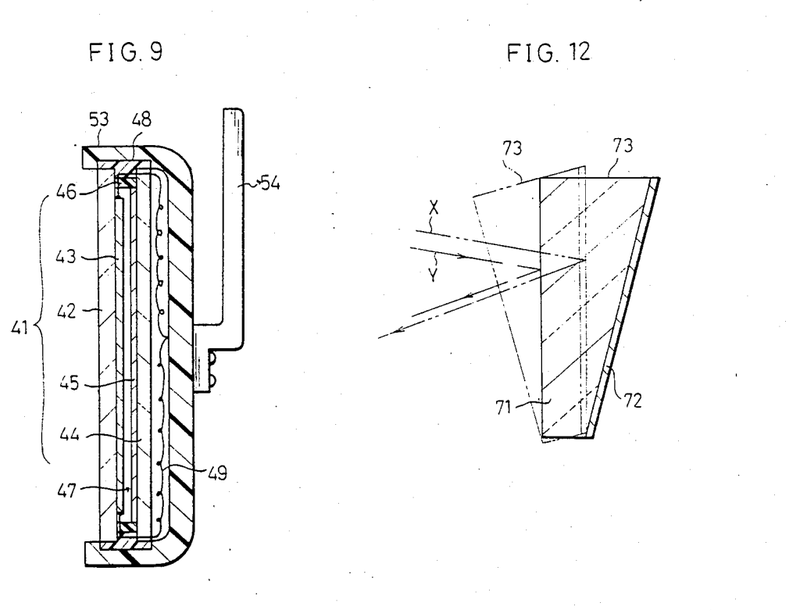
FIG. 9 is a sectional view illustrating the assembly structure of a glare-free automotive mirror of this invention.
FIG. 12 is a sectional view illustrating a related-art prism mirror.

As an example of glare-free, automotive mirrors (such as rearview mirrors), may be mentioned a prism mirror shown in FIG. 12, which comprises a transparent body 71 with its front and back faces being not parallel to each other, and a reflector layer 72 having a reflectance different from that of said transparent body 71 bonded thereto. When using this prism mirror 73 as a rearview mirror in the daytime, its mouting angle is adjusted so that the incident light will be reflected through the light path X in FIG. 12. When the strong light from the headlights of a succeeding car dazzles the driver's eyes in night driving, the dazzle of the light can be eliminated by changing the mounting angle of said prism mirror 73 so that the incident light will be reflected through the light path Y in FIG. 12.

Mirror angle control, however, is a cumbersome task for a working driver. A solution to this problem is a glare-free mirror using a transparent electrochromic element and utilizing the electrode layer on the back face of said electrochromic element as light-reflector layer. But a disadvantage of glare-free mirrors of this structure is that the color-developing layer of the electrochromic element is exposed to atmospheric humidity, making it difficult to exhibit its expected functions consistently over long periods. In addition, it is difficult to achieve an electrode that can function satisfactorily as light-reflector layer, because layers of smooth surface can hardly be obtained unless a very limited type of materials are used.

SUMMARY OF THE INVENTION

An object of this invention is to provide a process for manufacturing solid electrochromic element whereby electrode layers with high conductivity and ion-donating layers with high ion-donating capacity can be rapidly formed with high adhesion.

A further object of this invention is to provide a process for manufacturing solid electrochromic element whereby all the layers involved in the element can be continuously and efficiently formed in the same apparatus, with no danger of deterioration due to contamination with impurities.

Another object of this invention is to provide a dimmer of simple structure for automotive sun roof which is capable of properly adjusting the quantity of light entering the car interior by simple operation.

A still further object of this invention is to provide a dimmer for automotive side-watching window which allows easy control, as required, of the brightness of the side-watching window.

A still other object of this invention is to provide a dimmer for glare-free automotive mirror which is capable of exhibiting consistent antiglare function over long periods without the need for changing mirror mounting angle and with no adverse effect of atmospheric humidity.

Each of these objects is realized by this invention as described below.

For the first aspect of this invention, the process for manufacturing solid electrochromic element comprises the following steps: (1) forming the first electrode layer on a substrate by the ion plating technique, (2) forming one of an oxidation color-developing layer and a reduction color-developing layer on the first electrode layer, (3) forming an ion-donating layer on the one of the color-developing layers by the ion plating technique, (4) forming the other of reduction color-developing layer and the oxidation color-developing layer on the ion-donating layer, and (5) forming the second electrode layer on the other of color-developing layers by the ion plating technique.

For the second aspect of this invention, the dimmer for automotive sun roof comprises a transparent base plate and a transparent electrochromic element provided thereupon, the electrochromic element being composed of an oxidation color-developing layer, an ion-donating layer and a reduction color-developing layer laminated one upon another and sandwiched by a pair of electrode layers.

For the third aspect of this invention, the dimmer for automotive side-watching window comprises (1) a side-watching window provided at the door and the like near the driver's seat, the side-watching window being composed of a transparent base plate and a transparent electrochromic element provided thereupon, and (2) a regulator mechanism to regulate the light transmittance of the side-watching window by application of variable voltages to said electrochromic element.

For the fourth aspect of this invention, the dimmer for glare-free automotive mirror comprises a transparent base plate; an electrochromic element bonded to one surface of said base plate; a covering member placed opposite to the base plate to cover the electrochromic element; a light-reflecting layer provided on or near the covering member so as to be opposite to the electrochromic element and adapted to reflect incident rays from the electrochromic element; and a sealing member placed between the base plate and the covering member so as to surround the electrochromic element for preventing it from contact with atmospheric air.

The other objects of this invention will become apparent from the embodiments of this invention described below and from the accompanying claims. Many other advantages of this invention not explained herein will become apparent to those skilled in the art when this invention is put into practice.

DETAILED DESCRIPTION OF THE PREFERRED EMBODIMENTS (Process for Manufacturing Solid Electrochromic Element)

The process of this invention is detailed below while referring to related drawings.

Figure 1:
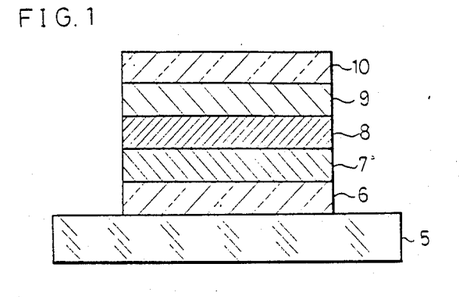
FIG. 1 is a sectional view illustrating the structure of a solid electrochromic element manufactured by the process of this invention.

FIG. 1 shows the structure of a solid electrochromic element manufactured by the process of this invention.

Although solid electrochromic element is of various types, a structure as shown in the figure is preferred, in which an oxidation color-developing layer 7, an ion-donating layer 8 and a reduction color-developing layer 9 are laminated one upon another and sandwiched between a pair of electrode layers 6 and 10. The redox reaction takes place in both of the two color-developing layers in a complementary manner unlike in a system containing only one color-developing layer; hence, there is no gas evolution due to side reactions and little deterioration of the element by corrosion, thus ensuring stable operation over long periods.

Figure 2:
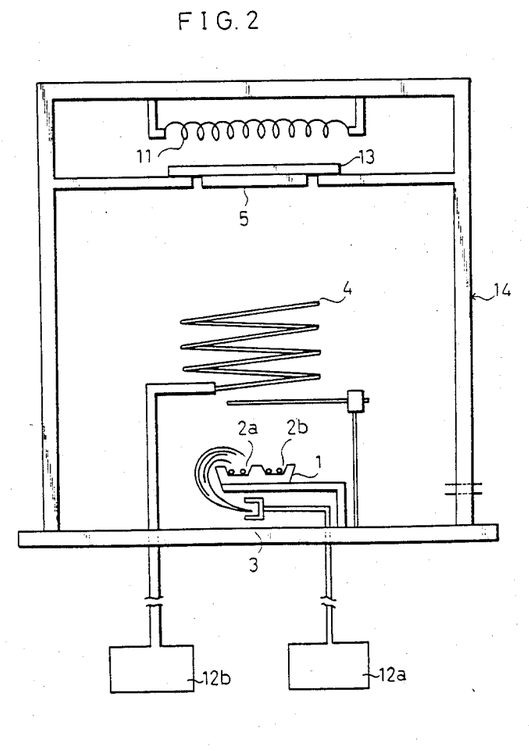
FIG. 2 is a schematic view of a high-frequency ion plating apparatus used for putting the process of this invention into practice.

FIG. 2 is a schematic view of an ion plating apparatus used for the manufacture of the solid electrochromic element of this invention. Tablets 2a, 2b of various types of transition metal oxides that will constitute the solid electrochromic element are put in the crucible 1 at the bottom center of the apparatus 14, and the apparatus was evacuated to about $10^{-3} \sim 10^{-5}$ Torr and charged with a trace amount of argon or oxygen gas. Numeral 11 is a heater for substrate, numeral 13 is a substrate holder, and numerals 12a and 12b are a power supply for EB and a high-frequency power supply, respectively. The tablets 2a, 2b, are evaporated by being heated to high temperatures by discharge from the electron beam gun (EB gun), the vapor thus formed is ionized by glow discharge from the high-frequency coil 4, and the resulting ions are forced to bombard the charged substrate 5, forming a thin film on its surface.

The high collison energy is an outstanding feature of this ion plating technique, which allows rapid formation of thin layers with higher adhesion compared with the vacuum deposition and sputtering proceses. In some types of materials, better results can be obtained when thin film is formed only by the electron beam process. In these cases, film formation may be effected only by discharge heating with the EB gun 3 without using the ion plating technique.

Thus, in the manufacture of electrochromic element, it is preferable that at least the pair of electrodes 6 and 10, and the ion donating layer 8 be formed by the ion plating technique and that the oxidation color-developing layer 7 and the reduction color-developing layer 9 be formed by the electron beam process. The thin layers 7 and 9 formed by the electron beam technique have the advantage of high density of color developed upon application of voltages because of the moderate porosity of the resulting film.

At least one of the two electrode layers should be made of a trasparent substance—typically, ITO ($In_2O_3$ containing 5 weight-% $SnO_2$).

Typical materials used for the oxidation color-developing layer 7 include $Cr_2O_3$, IrO, $NiO_x$, Ni and RhO; those used for the reduction color-developing layer 9 include $WO_3$, $MoO_3$ and $TiO_2$; and those used for the ion-donating layer 8 include $Ta_2O_5$, $ZrO_2$, $SiO_2$, $Y_2O_3$, $CaF_2$, $MgF_2$, Na-$\beta$-alumina and $Li_3N(Li^+)$. These elements are normally formed on a transparent glass substrate 5, but may also be formed on a plastic film substrate at a temperature lower than the heat distortion temperature of the plastic film.

The procedures for manufacturing an electrochromic element using the above-mentioned ion plating apparatus are described below.

1. Washing of substrate

A substrate 5 made of soda-lime glass and measuring $100 \times 100 \times 1.1$ mm was subjected to ultrasonic washing in a neutral detergent solution, rinsed with distilled water, and air-dried in a clean atmosphere. This glass substrate 5 was fixed to the substrate holder 13 and set in place in the apparatus 14.

2. Treatment for the first electrode layer

The apparatus 14 was evacuated down to $10^{-5}$ Torr and then charged with oxygen and argon gas to a pressure level of $5 \times 10^{-4}$ Torr. The glass substrate 5 was held at 200° C. and treated by the high-frequency ion plating process; discharge atmosphere was formed inside the apparatus 14 by operating the high-frequency coil 4 to ionize the vapor of ITO produced by discharge heating with the EB gun 3, forming a transparent thin film of ITO on the surface of substrate 5. The thickness of the thin layer of ITO was 2000 Å.

3. Treatment for the oxidation color-developing layer 3-1 When metallic Ni is used:

A thin film of $NiO_x$ (6000 Å) was formed on the thin layer of ITO prepared above by the ion plating technique while holding the substrate 5 at 300° C. in an oxygen gas atmosphere of $10^{-3}$ Torr.

3-2 When $NiO_x$ is used:

A thin film of $NiO_x$ (6000 Å) was formed on the thin layer of ITO prepared above by means of the EB gun 3 alone while holding the substrate 5 at 200° C. in an argon gas atmosphere of $10^{-3}$ Torr.

4. Treatment for the ion-donating layer

A thin film of $Ta_2O_5$ (5000 Å) was formed by the ion plating technique while holding the substrate 5 at 300° C. in an oxygen and argon gas atmosphere of $5 \times 10^{-4}$ Torr.

5. Treatment for the reduction color-developing layer

A thin film of $WO_3$ (6000 Å) was formed by means of the EB gun 3 alone while holding the substrate 5 at 200° C. in a nitrogen or argon gas atmosphere of $10^{-3}$ Torr.

6. Treatment for the second transparent electrode layer

A thin film of ITO (2000 Å) was formed by the ion plating technique in the same manner as in the treatment for the first transparent electrode layer described above.

Figure 3:
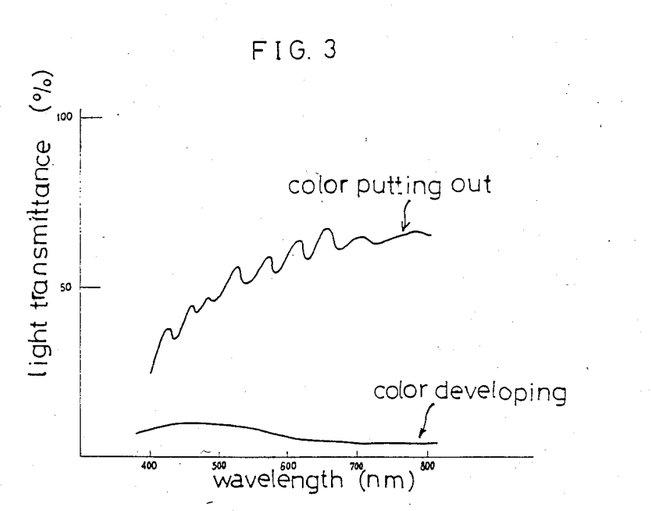
FIG. 3 is a graph in which light transmittance of an electrochromic element of this invention is plotted against wavelength.

The substrate 5 was then taken out from the apparatus 14, and lead wires were attached to the first and second transparent electrode layers 6 and 9, making an electrochromic element. FIG. 3 shows the relationship of light transmittance of the electrochromic element thus prepared versus wavelength when color is developed and when it is put out.

As may be seen from the above, this process allows a plurality of layers to be continuously formed in the same apparatus if the high-frequency ion plating technique and the deposition process by EB gun 3 are properly combined, thus ensuring higher productivity and eliminating contamination of the resulting element with impurities.

It is also possible to form thin layers by the same manner in the ion plating apparatus 14 from the other active substances enumerated above. The same effect can also be achieved when the oxidation color-developing layer 7 and the reduction color-developing layer 9 are alternated.

(Dimmer for automotive sun roof)

Description is made below on a preferred embodiment of the dimmer for automotive sun roof using solid electrochromic element manufactured by the process of this invention as explained above.

Proper combination of the ion plating technique and the electron beam process as stated above ensures successive lamination of a pair of electrode layers, an oxidation color-developing layer, an ion-donating layer and a reduction color-developing layer in the form of thin film, thus giving an electrochromic element with very high transparency.

Figure 4:
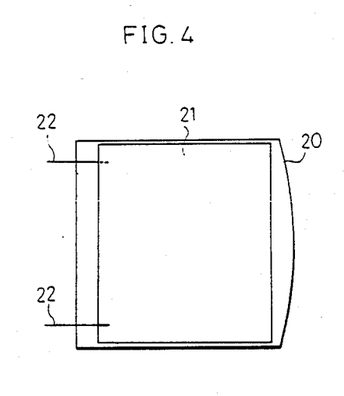
FIG. 4 is a plan view of an automotive sun roof of this invention.

The electrochromic element of this type is normally formed on a transparent substrate made of an inorganic or organic material; in order to provide this element in a sun roof, one may use a transparent glass plate as substrate (20 in FIG. 4). An alternative method is to form the element on a transparent plastic film at a temperature lower than its heat distortion temperature and to laminate it on the glass plate 20. Alternatively, this element may be sandwiched, either alone or together with a transparent plastic film, between two sheets of glass plates.

The pair of electrode layers in the electrochromic element 21 are connected to lead wires 22 leading from a power supply not shown in the figure. Applying a voltage to the electrochromic element 21 induces a redox reaction in it, causing a reversible change in its light transmittance. Hence, the quantity of light entering the car interior can be easily controlled by operating a switch installed on the instrument panel and changing the voltage impressed on the electrochromic element 21 through a regulator mechanism.

The dimmer for sun roof of this invention releases the driver from the cumbersome work of adjusting the quantity of light entering the car interior while observing the state of the sun roof as is required with the related-art dimmer shown in FIG. 5. The operational burden of the driver can be further diminished by providing a light sensor to detect sunlight and a mechanism to automatically control the voltage to be impressed to the electrochromic element in response to the signal from said sensor. The sun roof of this invention also helps minimize the ultraviolet deterioration of interior trims and protects the privacy of drivers from larger and higher cars, if the transmittance of the electrochromic element has been set at a low level. Furthermore, use of a colored electrochromic element (tinted in blue or other suitable color) will give the car better looks.

(Dimmer for automotive side-watching window)

Description is given below on a preferred embodiment of the dimmer for automotive side-watching window using solid electrochromic element manufactured by the process of this invention explained above.

As shown in FIG. 6, a side-watching window 31 is provided on a car (especially on large cars such as motortrucks) at the right door 32 near the driver's seat, so that the driver, when turning to the right or changing the lane, can look the situations of the side road through said window 31. As can be seen from FIG. 7, the side-watching window 31 is composed of (1) the outermost, transparent base plate 33 (made of an inorganic or organic glass) fixed to the door 32 through the edging member 34 made of rubber; (2) the transparent electrochromic element 35 attached to the inner surface of said base plate 33, said electrochromic element consisting of an oxidation color-developing layer, an ion-donating layer and a reduction color-developing layer laminated one upon another and sandwiched between a pair of electrode layers according to the procedure described above, and said electrode layers being connected to respective lead wires; and (3) the innermost, transparent protective glass 37 placed opposite to said glass base plate 33 at a predetermined distance and fixed to the door member through the edging member 34 so as to completely cover said electrochromic element 35.

Figure 7:
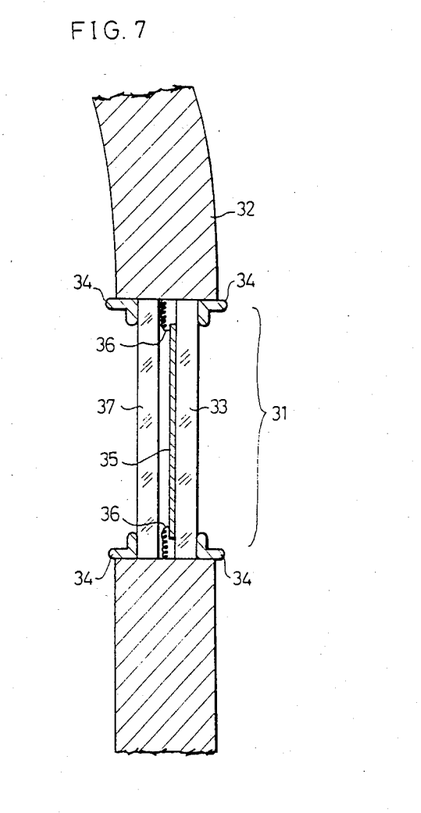
FIG. 7 is an enlarged sectional view showing the installation structure of an automotive side-watching window of this invention.

The lead wires 36 for the electrochromic element 35 are connected to a regulator mechanism (not shown in the figure), which applies a variable voltage to the electrochromic element, thereby regulating the light transmittance of said side-watching window 31. This mechanism is composed of a power supply such as a battery, a voltage controller such as a transformer, and other parts. When a voltage is impressed from this mechanism to the transparent electrochromic element 35, a redox reaction takes places in it, causing a reversible change in light transmittance of the side-watching window. Hence, transmittance of light through the window can be intercepted during normal driving or while the car is stopping so that nothing will come in sight of the driver, while road situations can be observed, as required, through the window by increasing its light transmittance.

If a control mechanism to control said regulator mechanism in response to the winker lever operation is further provided between the regulator mechanism and the winker lever, operating the winker lever when turning to the right or changing the lane will automatically increase the light transmittance of the side-watching window, thus enabling the driver to look the situations of the side road through said window.

If a mechanism that acts in concert with the speedmeter is provided, it is possible to automatically set up a system that allows the driver to observe the road situations, for example, during running at low speeds.

As detailed above, this dimmer for side-watching window is simple in structure, is free from the troubles that the road flickers in the sight of driver or privacy in the cab cannot be assured, and has the advantage that the driver can confirm the road situations as required.

The dimmer for automotive side-watching window are not limited to the embodiment described above. Many other preferable embodiments may be used, for example, a side-watching window prepared by forming a transparent electrochromic element 35 on a transparent plastic film as substrate at a temperature below its heat distortion temperature, and laminating it on the surface of the glass base plate 33.

(Dimmer for glare-free automotive mirror)

Description is given below on a preferred embodiment of the dimmer for glare-free automotive mirror using solid electrochromic element manufactured by the process of this invention explained above.

Figure 8:
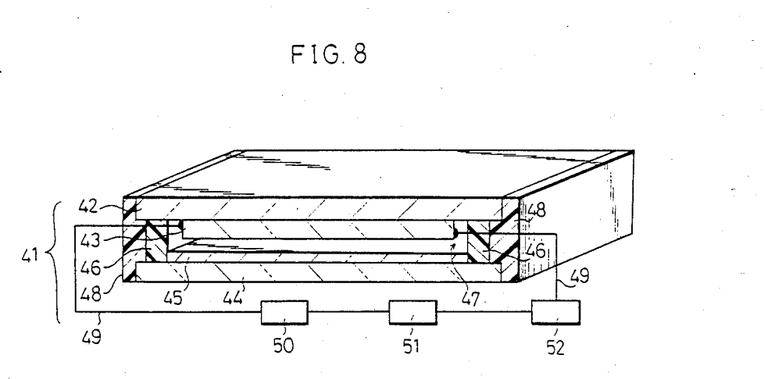
FIG. 8 is a partially cutaway view illustrating an embodiment of the glare-free automotive mirror of this invention.

As shown in FIG. 8, the glare-free mirror 41, used as a rearview mirror in car interior, has the transparent, glass base plate 42 as its front part, with the solid electrochromic element 43 (composed of an oxidation color-developing layer, an ion-donating layer and a reduction color-developing layer laminated upon one another and sandwiched between a pair of electrode layers) attached to the back of said glass base plate 42, thus allowing the light from the rear side of the car to enter the mirror at the front face of the glass base plate 42 and passes through said electrochromic element 43.

The glare-free mirror 41 has, as its backside part, a glass cover plate 44 placed opposite to the glass base plate 42 at a definite spacing so as to completely cover the back face of the electrochromic element 43. The light-reflecting layer 45 is provided on the inside surface of the cover plate 44 so as to be opposite to the whole back face of said electrochromic element 43, so that the light passing through the electrochromic element will be reflected on its surface.

The annular spacer 46 is provided between the glass base plate 42 and the cover plate 44 so as to surround the whole periphey of the electrochromic element 43, thus allowing a given space 47 between the element 43 and the light-reflecting layer 45. This space contains moisture that participates in the color development/extinction reaction. The annular sealing member 48 made of epoxy resin is applied around all the sides of glass base plate 42 and cover plate 44 and around the whole external surface of said spacer 46, thereby sealing said space 47 and keeping said electrochromic element 43 out of contact with atmospheric air.

The two electrode layers of the electrochromic element 43 are connected to the power supply 50 through the lead wires 49. The control circuit including these lead wires 49 has the switch 51, the voltage regulator 52 and other devices, and is designed to apply a constant or variable voltage to the electrochromic element through the voltage regulator 52 by switch operation.

The glare-free mirror 41 of this structure can be installed inside a car by housing it in the support 53 as shown in FIG. 9, and fixing the support, through the mounting arm 54, at the upper front part of the cab, followed by connection of the lead wires 49.

In the daytime when it is bright outside, the glare-free mirror 41 is used with the supply of voltage to the electrochromic element 43 stopped. In this condition, the glare-free mirror can be used as a rearview mirror because the light from the rear is reflected on the light-refleting layer 45 to get into the driver's eyes. During the night when it is dark outside, on the contrary, a voltage is applied to the electrochromic element by turning the switch 51 on. This induces the redox reaction in the color-developing layers to develop color, lowering the light transmittance of the electrochromic element 43 in response of the voltage impressed. The result is a decrease in the intensity of light passing through the element and reflecting on the light-reflecting layer 45, thus minimizing the dazzle of the light from the headlights of succeeding cars.

Figure 10:
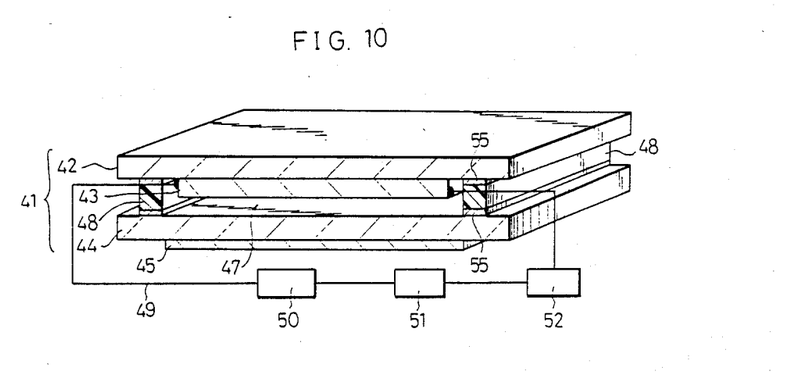
FIG. 10 is a partially cutaway view illustrating another glare-free automotive mirror of this invention.
Figure 11:
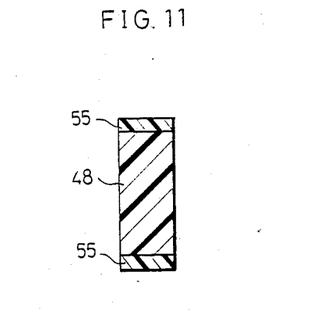
FIG. 11 is an enlarged sectional view of the sealing member for the above-mentioned glare-free automotive mirror of this invention.

FIGS. 10 and 11 show another example of the dimmer for glare-free mirror of this invention, which differs from the embodiment described above in the manner in which the light-reflecting layer 45 and sealing member 48 are disposed. The light-reflecting layer 45 in this example is attached to the external surface of the cover plate 44 made of transparent glass. The sealing member 48 made of silicone rubber is provided between the glass base plate 42 and the cover plate 44 so as to surround the electrochromic element 43, and is bonded to the two plates, 42 and 44, with an adhesive 55. Therefore the sealing member 48 in this example serves not only to seal the space 47 but to retain the distance between the electrochromic element 43 and the light-reflecting layer 45. All the other details of configuration and functions are the same as in the embodiment described above.

Many other different embodiments may be made of the dimmer for glare-free mirror of this invention. These include:

(1) Use of an organic glass material, such as polymethyl methacrylate, for the above-mentioned glass base plate 42 and the cover plate 44.

(2) The case in which either one of the two electrode layers in the electrochromic element 43 is transparent and the other is slightly colored.

(3) The sealing member 48 being monolithically molded with the periphery of the glass base plate 42 or of the cover plate 44.

(4) Formation of a light-reflecting surface by polishing the material used for the cover plate 44.

The glare-free mirror of this invention, comprising an electrochromic element and a light-reflecting layer placed opposite thereto, has the advantage that the dazzle of the light coming from the rear can be eliminated by simple ON/OFF operation of power supply without the need to alter the mounting angle of the mirror. In addition, the electrochromic element, sealed airtight in a space, is not affected by atmospheric humidity and hence exhibits its antiglare function consistently over long periods. Furthermore, the light-reflecting layer is disposed separately from the electrochromic element. This means a wider choice of material types to be used for the light-reflecting layer, compared with conventional mirrors in which the backside electrode layer in the electrochromic element is utilized also as light reflector, thus allowing easy formation of light-reflecting layers with high surface smoothness.

It is apparent that many widely different embodiments of this invention may be made without departing from the spirit and scope thereof; hence, this invention is not limited in any way by specific embodiments except by the accompanying claims.

What is claimed is:

1. A process for manufacturing solid electrochromic element which comprises the following steps: (1) forming a first electrode layer on a substrate by the ion plating technique, (2) forming one of an oxidation color-developing layer and a reduction color-developing layer on said first electrode layer, (3) forming an ion-donating layer on said one of the color-developing layers by the ion plating technique, (4) forming the other reduction color-developing layer and the oxidation color-developing layer on said ion-donating layer, and (5) forming a second electrode layer on the other color-developing layer by the ion plating technique.

2. The process for manufacturing solid electrochromic element as defined in claim 1, wherein said one of the oxidation color-developing layer and the reduction color-developing layer is formed on said first electrode layer by the electron beam process and the other reduction color-developing layer and the oxidation color-developing layer is formed on said ion-donating layer by the electron beam process.

3. The process for manufacturing solid electrochromic element as defined in claim 2, wherein all of the layers are formed in the same apparatus.

* * * * *